Patented Dec. 30, 1941

2,268,146

UNITED STATES PATENT OFFICE 2,268,146

DIELECTRIC COMPOSITION

Victor F. Hanson, Niagara Falls, and Paul La Frone Magill, Ransomville, N. Y., assignors to E. I. du Pont de Nemours & Company, Wilmington, Del., a corporation of Delaware No Drawing. Application August 19, 1940, Serial No. 353,247

6 Claims. (Cl. 252—66)

This invention relates to dielectric compositions and more particularly to liquid dielectrics which comprise chlorinated organic compounds.

Various chlorinated organic compounds which are normally liquids or which may be used to make liquid dielectric compositions have been proposed as dielectrics for transformers, condensers, and other electrical apparatus. Such liquid dielectrics may be used in the form of liquid insulators surrounding the apparatus contained in suitable containers, for example, as transformer liquids. Also, such dielectric liquids are used to coat or impregnate paper or other porous materials to form composite dielectric bodies. Various chlorinated organic compounds and mixtures of them have been proposed for use as dielectrics, for example: chlorinated benzenes such as dichlorobenzene, trichlorobenzene, and mixtures of the various polychlorobenzenes; chlorinated diphenyls, e. g. dichloro diphenyl, and the various polychlorinated alkyl benzenes, for example, ethyl trichlorobenzene, ethyl tetrachlorobenzene, ethyl pentachlorobenzene and the like and mixtures of these nuclear chlorinated ethyl benzenes.

It has been found that when the organic chlorinated compounds are subjected to use as dielectrics in electrical apparatus and especially when the dielectric material is in contact with iron or steel parts, the dielectric properties often tend to gradually deteriorate. The extent and rate of deterioration will depend upon the nature of the dielectric material and the conditions of use. Generally, the deterioration is most pronounced when the dielectric liquid becomes subjected to elevated temperatures, which is a frequent occurrence in many electrical devices.

The above mentioned chlorinated compounds also have utility as heat exchange liquids for a variety of purposes outside of their use as dielectrics, as well as in conjunction therewith. For example, when these compounds, or compositions containing them are used as transformer dielectrics, they also serve to conduct heat developed in the transformer windings to the exterior of the transformer case, where the heat may be dissipated by known means. Also, such compositions may be used for transferring heat in a variety of applications, for example to control temperature in catalytic and other chemical reactions, to heat ovens, to cool hot gases, and various other known heat transfer operations. In such heat exchange operations, the non-flammable character of these chlorinated compounds is of advantage. On the other hand, the tendency to deteriorate when heated to elevated temperatures, is a disadvantage in the use of these materials, since such deterioration usually is accompanied by the formation of acidic materials which tend to corrode the metal walls of the heat exchange apparatus.

An object of the present invention is to provide a means for prevention of the deterioration of electrical properties of dielectrics comprising chlorinated organic compounds. A further object is to provide an improved dielectric composition which is stable under conditions of use. Another object is to provide a dielectric composition comprising one or more of the polychlorides of ethyl benzene which is stabilized against deterioration of its electrical properties during normal use as a dielectric. Another object is to stabilize the chlorinated ethylbenzenes and other chlorinated aromatic compounds, to prevent their deterioration at elevated temperatures, especially when in contact with ferrous metal. Further objects will be apparent from the following description of the invention.

The above-stated objects may be attained in accordance with the present invention by adding as stabilizer to the chlorinated dielectric material a small amount of dihydronaphthalene or a dimer thereof. For example, we have found that a liquid dielectric comprising a mixture of ethyl trichlorobenzene, ethyl tetrachlorobenzene, and ethyl pentachlorobenzene to which has been added 2% by weight of dihydronaphthalene undergoes substantially no change in its electrical properties under conditions of use which cause rapid deterioration of electrical properties of the same mixture containing no stabilizing material. The dimers of dihydronaphthalene likewise have a definite and advantageous stabilizing action although not as great as that of monomeric dihydronaphthalene. On the other hand, the dimers are superior to the unpolymerized dihydronaphthalene as a dielectric material. Accordingly, in some cases, it is desirable to use the dimer rather than the unpolymerized dihydronaphthalene, in order to obtain the optimum dielectric properties. It is further understood that various mixtures of monomeric and dimeric dihydronaphthalene may be used.

Dihydronaphthalene ($C_{10}H_{10}$) is a well-known chemical, which may be made by reduction of naphthalene by known methods. It exists in two isomeric modifications, i. e. 1,2-dihydronaphthalene and 1,4-dihydronaphthalene. The crude material often contains both isomers; these may be separated by known methods. Throughout this specification and in the appended claims, we use the term "dihydronaphthalene" to include the two isomers. However, for best results we prefer to use the 1,4-isomer or a dihydronaphthalene or dimer thereof which consists at least preponderantly of the 1,4-isomer. The dimers of dihydronaphthalene and methods for preparing them are described in U. S. Patent 2,194,450 by N. D. Scott and J. F. Walker. The dimers are viscous, liquid, resinous materials, which may vary in viscosity and apparent molecular weight, depending on the degree of purity, the chief impurities being unpolymerized dihydronaphthalene and higher polymers thereof. Whereas the pure dimer has a true molecular weight of 260, corresponding to the formula $(C_{10}H_{10})_2$, the impure, commercial grades, which likewise are suitable for the present invention, may have apparent molecular weights of about 250 to 320. They are soluble in chlorinated aromatic compounds and hence the stabilized dielectrics of the present invention may readily be prepared merely by mixing the dihydronaphthalene or polymer with the chlorinated dielectric liquids.

The following example illustrates the effectiveness of the herein described stabilizers:

Example

To separate portions of a mixture of polychlor ethylbenzenes was added 2% by weight of dihydronaphthalene and a liquid dimer of dihydronaphthalene. Power factor tests were made on these mixtures; then 350 cc. of each sample was placed in a glass flask with a piece of iron having 24 sq. in. of surface and heated at a temperature of 150° C. for two hours under an atmosphere of nitrogen. The samples then were cooled and the power factors again determined. A third sample of the ethyl polychlorbenzene mixture, to which no stabilizer was added, was subjected to the same test.

The power factor test was a standard test at 60 cycles, 2 kv., in a nickel cell, carried out at a temperature of 80° C. This test was performed on a Schering bridge according to the method outlined by the American Society for Testing Materials prepared by Committee D-9 on Electrical insulating materials, designation D150–36T of 1936.

The following results were obtained by the above-described procedure:

| Test | Stabilizer added | Power factor | |
|---|---|---|---|
| | | Before heating | After heating |
| A | Dihydronaphthalene | 1.30 | 1.45 |
| B | Dihydronaphthalene dimer | 1.19 | 6.00 |
| C | None | 1.32 | 18.00 |

The proportion of the stabilizer to be added to the chlorinated dielectric will depend upon the stabilizer used, the nature of the dielectric and the degree of stabilization desired. Generally, to give adequate protection against deterioration, a minimum of 0.1% by weight of the stabilizer should be added. However, in accordance with this invention, the concentration of the dihydronaphthalene or dihydronaphthalene dimer added as stabilizer will not exceed about 10% by weight, since the addition of larger quantities effects substantially no further improvement in stability. In general, we prefer to utilize from 1 to 5% by weight of the herein described stabilizers in the dielectric compositions.

We claim:

1. A composition of matter comprising a chlorinated aromatic hydrocarbon which contains as stabilizer up to 10% by weight of a polycyclic hydrocarbon selected from the group consisting of dihydronaphthalene and dihydronaphthalene dimer.

2. A composition of matter comprising polychlorethylbenzene which contains as stabilizer up to 10% by weight of a polycyclic hydrocarbon selected from the group consisting of dihydronaphthalene and dihydronaphthalene dimer.

3. A dielectric composition comprising polychlorethylbenzene which contains as stabilizer 0.1 to 10% by weight of a polycyclic hydrocarbon selected from the group consisting of 1,4-dihydronaphthalene and its dimer.

4. A dielectric composition comprising polychlorethylbenzene which contains as stabilizer up to 10% by weight of 1,4-dihydronaphthalene.

5. A dielectric composition comprising polychlorethylbenzene which contains as stabilizer about 1 to 5% by weight of 1,4-dihydronaphthalene.

6. A dielectric composition comprising polychlorethylbenzene which contains as stabilizer about 1 to 5% by weight of 1,4-dihydronaphthalene dimer.

VICTOR F. HANSON.
PAUL LA FRONE MAGILL.